US009739373B2

(12) United States Patent
Enami

(10) Patent No.: US 9,739,373 B2
(45) Date of Patent: Aug. 22, 2017

(54) VEHICLE SPEED CHANGE APPARATUS

(71) Applicant: ISUZU MOTORS LIMITED, Tokyo (JP)

(72) Inventor: Katsuhiro Enami, Kamakura (JP)

(73) Assignee: ISUZU MOTORS LIMITED, Tokyo (JP)

( * ) Notice: Subject to any disclaimer, the term of this patent is extended or adjusted under 35 U.S.C. 154(b) by 392 days.

(21) Appl. No.: 14/394,560

(22) PCT Filed: May 16, 2013

(86) PCT No.: PCT/JP2013/063686
§ 371 (c)(1),
(2) Date: Oct. 15, 2014

(87) PCT Pub. No.: WO2013/176036
PCT Pub. Date: Nov. 28, 2013

(65) Prior Publication Data
US 2015/0075308 A1  Mar. 19, 2015

(30) Foreign Application Priority Data

May 23, 2012 (JP) .................................. 2012-117590

(51) Int. Cl.
F16H 63/20 (2006.01)
F16H 61/28 (2006.01)
(Continued)

(52) U.S. Cl.
CPC ........... F16H 61/28 (2013.01); F16H 59/041 (2013.01); F16H 59/042 (2013.01); F16H 61/02 (2013.01);
(Continued)

(58) Field of Classification Search
CPC ........... F16H 2063/3063; F16H 63/304; F16H 61/32; F16H 2061/28884; F16H 2063/3083; F16H 2063/3076; F16H 2200/0052
See application file for complete search history.

(56) References Cited

U.S. PATENT DOCUMENTS 6,591,705 B1 * 7/2003 Reik ..................... B60W 10/02
74/335
2004/0083045 A1 4/2004 Nohara et al.
(Continued)

FOREIGN PATENT DOCUMENTS

JP 2003-139227 5/2003
JP 2003-240115 8/2003
JP 2010-159823 7/2010

OTHER PUBLICATIONS

Written Opinion of the International Searching Authority mailed Jul. 23, 2013 in corresponding International Application No. PCT/JP2013/063686.
(Continued)

Primary Examiner — William Kelleher
Assistant Examiner — Gregory T. Prather
(74) Attorney, Agent, or Firm — Staas & Halsey LLP

(57) ABSTRACT

A vehicle speed change arrangement that can perform automatic speed change using a manual transmission, including shift blocks such that a shift block of a reverse-1st speed, a shift block of 4th speed-5th speed, a shift block of 2nd speed-3rd speed, and a shift block of 6th speed are arranged in this sequence in a select operation direction. The arrangement also includes first to fourth shift levers for shifting the shift blocks, select actuators for selecting the first to fourth shift levers, a first shift actuator for shifting the first or second shift lever, a second shift actuator for shifting the third or fourth shift lever, a gear disengagement determina-
(Continued)

tion unit for determining whether a gear is disengaged when the gear engagement or disengagement is made using the first and second shift actuators, and a drive unit for driving the gear engaging shift actuator when gear disengagement is determined.

6 Claims, 8 Drawing Sheets

(51) Int. Cl.
  *F16H 61/02* (2006.01)
  *F16H 61/32* (2006.01)
  *F16H 63/30* (2006.01)
  *F16H 59/04* (2006.01)

(52) U.S. Cl.
  CPC ......... *F16H 61/0204* (2013.01); *F16H 61/32* (2013.01); *F16H 63/20* (2013.01); *F16H 63/304* (2013.01); *F16H 2063/208* (2013.01); *F16H 2063/3059* (2013.01); *F16H 2063/3063* (2013.01); *Y10T 74/19251* (2015.01)

(56) References Cited

U.S. PATENT DOCUMENTS

| | | | |
|---|---|---|---|
| 2007/0037660 A1* | 2/2007 | Shishido | F16H 61/0437 477/74 |
| 2010/0242657 A1* | 9/2010 | Shintani | F16H 61/688 74/473.24 |
| 2011/0203401 A1* | 8/2011 | Neelakantan | F16H 61/688 74/473.12 |

OTHER PUBLICATIONS

Patent Abstracts of Japan, Publication No. 2003-139227, published May 14, 2003.
Patent Abstracts of Japan, Publication No. 2003-240115, published Aug. 27, 2003.
Patent Abstracts of Japan, Publication No. 2010-159823, published Jul. 22, 2010.
International Search Report mailed Jul. 23, 2013, in corresponding International Patent Application No. PCT/JP2013/063686.

* cited by examiner (a)

(b)

(c)

VEHICLE SPEED CHANGE APPARATUS

CROSS-REFERENCE TO RELATED APPLICATIONS

This application is a U.S. National Stage Application, which claims the benefit under 35 U.S.C. §371 of PCT International Patent Application No. PCT/JP2013/063686, filed May 16, 2013, which claims the foreign priority benefit under 35 U.S.C. §119 of Japanese Patent Application No. 2012-117590, filed May 23, 2012, the contents of which are incorporated herein by reference.

TECHNICAL FIELD

The present invention relates to a vehicle speed change apparatus (i.e., transmission device of a vehicle) in which gear shifting operations are automatized based on a manual transmission.

BACKGROUND ART

A general 6-speed manual transmission (hereinafter referred to as a transmission) will be described with reference to FIG. 8.

A transmission TM includes an input shaft 10, an output shaft 11, and a counter shaft 12. The output shaft 11 is disposed coaxially with this input shaft 10. The counter shaft 12 is disposed parallel to the input shaft 10 and output shaft 11. An input main gear 13 is disposed on the input shaft 10. A 1st speed (1st) main gear M1, a 2nd speed (2nd) main gear M2, a 3rd speed (3rd) main gear M3, a 4th speed (4th) main gear M4, and a reverse main gear MR are journally supported on the output shaft 11, and a 6th speed (6th) main gear M6 is fixedly secured on the output shaft 11. On the counter shaft 12, an input counter gear 14, a 1st speed counter gear C1, a 2nd speed counter gear C2, a 3rd speed counter gear C3, a 4th speed counter gear C4, and a reverse counter gear CR are fixedly secured, and a 6th speed counter gear C6 is journally supported. The input counter gear 14 engages with the input main gear 13. The 1st speed counter gear C1 engages with the 1st speed main gear M1. The 2nd speed counter gear C2 engages with the 2nd speed main gear M2. The 3rd speed counter gear C3 engages with the 3rd speed main gear M3. The 4th speed counter gear C4 engages with the 4th speed main gear M4. The reverse counter gear CR engages with the reverse main gear MR via an idle gear IR. The 6th speed counter gear C6 engages with the 6th speed main gear M6.

In this transmission TM, a sleeve S1 is spline-engaged (meshed) with a hub 111 secured to the output shaft 11. When the sleeve S1 is spline-engaged with a dog DR of the reverse main gear MR, the output shaft 11 rotates reversely. When the sleeve S1 is spline-engaged with a dog D1 of the 1st speed main gear M1, the output shaft 11 rotates at a speed corresponding to the 1st speed. A sleeve S2 is spline-engaged with a hub H2 secured to the output shaft 11. When the sleeve S2 is spline-engaged with a dog D2 of the 2nd speed main gear M2, the output shaft 11 rotates at a speed corresponding to the 2nd speed. When the sleeve S2 is spline-engaged with a dog D3 of the 3rd speed main gear M3, the output shaft 11 rotates at a speed corresponding to the 3rd speed.

A sleeve S4 is spline-engaged with a hub 114 secured to the output shaft 11. When the sleeve S4 is spline-engaged (meshed) with a dog D4 of the 4th speed main gear M4, the output shaft 11 rotates at a speed corresponding to the 4th speed. When the sleeve S4 is spline-engaged with a dog D5 of the input main gear 13, the output shaft 11 rotates at a speed corresponding to the 5th speed (5th) (in the directly-coupled state). A sleeve S6 is spline-engaged with a hub H6 secured to the counter shaft 12. When the sleeve S6 is spline-engaged with a dog D6 of the 6th speed counter gear C6, the output shaft 11 rotates at a speed corresponding to the 6th speed.

The sleeves S1, S2, S4, and S6 are manually operated by a driver with a driver's shift lever within the driver's cabin via shift forks F1, F2, F4, and F6 and a shift shaft.

A shift control system in an actual transmission will be described with reference to FIG. 9 and FIG. 10.

In FIG. 9 and FIG. 10, a low speed shift shaft 15a and a high speed shift shaft 15b are disposed parallel to the vehicle width direction and along the longitudinal direction of the vehicle. At a rear portion of the low speed shift shaft 15a, a first shift fork F1 is fixedly secured. The first shift fork F1 shifts between the 1st speed and the reverse (Rev). In front of the first shift fork F1, a second shift fork F2 is disposed to be movable with respect to the shift shaft 15a. The second shift fork F2 shifts between the 2nd speed and the 3rd speed.

On the other hand, a third shift fork F4 is disposed at a front portion of the high speed shift shaft 15b such that the third shift fork F4 is movable with respect to the shift shaft 15b. The third shift fork F4 shifts between the 4th speed and the 5th speed. At the rear portion of the shift shaft 15b, a counter shaft shift 15c is disposed parallel to the shift shaft 15b. The shift shaft 15b and the counter shaft shift 15c are coupled together by a link lever 16. On this counter shaft shift 15c, a fourth shift fork F6 is fixedly secured. The fourth shift fork F6 shifts to the 6th speed.

On the low speed shift shaft 15a, a boss 17a is disposed in front of the second shift fork F2. A reverse-1st speed shift block B1 is integral with the boss 17a. On the high speed shift shaft 15b, a boss 17b is disposed behind the third shift fork F4. A 6th speed shift block B6 is integral with the boss 17b.

Between the reverse-1st speed shift block B1 and the 6th speed shift block B6, a 2nd speed-3rd speed shift block B2 and a 4th speed-5th speed shift block B4 are arranged. The 2nd speed-3rd speed shift block B2 is coupled to the second shift fork F2 by a coupling member 18a. The 4th speed-5th speed shift block B4 is coupled to the third shift fork F4 by a coupling member 18b.

The reverse-1st speed shift block B1, the 2nd speed-3rd speed shift block B2, the 4th speed-5th speed shift block B4, and the 6th speed shift block B6 are arranged from the low speed gear to the high speed gear. With the operation of the driver's shift lever, select operations are sequentially performed from the neutral position of the reverse-1st speed to those of the 2nd speed-3rd speed, the 4th speed-5th speed, and the 6th speed. Subsequently, a shift operation is performed from the neutral position of the selected shift block B1, B2, B4, or B6 to a desired gear position (shift position).

That is, when the shift lever engages with the reverse-1st speed shift block B1, the reverse-1st speed shift block B1 is moved forward by the shift lever. Accordingly, the first shift fork F1 is moved forward via the boss 17a and the shift shaft 15a so as to shift from the neutral position to the 1st speed. When the reverse-1st speed shift block B1 is moved rearward, the first shift fork F1 is moved rearward so as to shift from the neutral position to the reverse gear position.

When switching to the 2nd speed or the 3rd speed is desired, the engagement position of the shift lever is moved to the neutral position of the 2nd speed-3rd speed shift block B2 by the select operation. From this state, the 2nd speed- 3rd speed shift block B2 is moved rearward by the shift lever. Accordingly, the second shift fork F2 is moved rearward via the coupling member 18a so as to shift from the neutral position to the 2nd speed. The 2nd speed-3rd speed shift block B2 is moved forward so as to shift from the neutral position to the 3rd speed.

When switching to the 4th speed or the 5th speed is desired, the shift lever is moved to the neutral position of the 4th speed-5th speed shift block B4 by the select operation. Subsequently, the 4th speed-5th speed shift block B4 is moved rearward. Accordingly, the third shift fork F4 is moved rearward via the coupling member 18b so as to shift from the neutral position to the 4th speed. The 4th speed-5th speed shift block B4 is moved forward so as to shift from the neutral position to the 5th speed.

When switching to the 6th speed is desired, the shift lever is moved to the neutral position of the 6th speed shift block B6 by the select operation. Subsequently, the 6th speed shift block B6 is moved rearward. Accordingly, the shift shaft 15b is moved rearward via the boss 17b, and the counter shaft shift 15c is moved forward via the link lever 16. Thus, the fourth shift fork F6 is moved forward so as to shift from the neutral position to the 6th speed.

In FIG. 9 and FIG. 10, reference numeral 19 denotes ball clicks for holding the shafts 15a and 15b at the respective gear positions and neutral positions.

FIG. 11(a) illustrates the above-described shift patterns of the transmission TM.

In FIG. 11(a), the reverse-1st speed shift block B1 described with reference to FIG. 9 and FIG. 10 is used to perform a shift operation between the reverse and the 1st speed (shift operation to the reverse or to the 1st speed). The 2nd speed-3rd speed shift block B2 is used to perform a shift operation between the 2nd speed and the 3rd speed (shift operation to the 2nd speed or to the 3rd speed). The 4th speed-5th speed shift block B4 is used to perform a shift operation between the 4th speed and the 5th speed (shift operation to the 4th speed or to the 5th speed). The 6th speed shift block B6 is used to perform a shift operation to the 6th speed. When the shift lever is moved by the select operation, the shift lever is moved along the aligned neutral positions of the reverse-1st speed shift block B1, the 2nd speed-3rd speed shift block B2, the 4th speed-5th speed shift block B4, and the 6th speed shift block B6.

A gear shifting operation with this manual transmission will be described. For example, in the case from the 2nd speed to the 3rd speed, as illustrated in FIG. 11(b), the gear is disengaged from the 2nd speed to the neutral position. Subsequently, the gear is engaged from the neutral position to the 3rd speed. This is straight shifting (i.e., shifting without the select operation). As illustrated in FIG. 11(c), in the case of a gear shift operation from the 3rd speed to the 4th speed, the gear is disengaged from the 3rd speed to the neutral position. Subsequently, a select operation is performed on the shift lever so as to move to the neutral position of the 4th speed-5th speed shift block B4, and the gear is engaged from the neutral position to the 4th speed. This is an elbow plus elbow (crank) shifting (i.e., shifting with the select operation).

Operations similar to the above-described operations are required in an automatic transmission that is equipped with an automatic shifting device prepared based on the transmission illustrated in FIG. 9 and FIG. 10.

That is, it is necessary to provide shift levers to be selectively engaged with the reverse-1st speed shift block B1, the 2nd speed-3rd speed shift block B2, the 4th speed-5th speed shift block B4, and the 6th speed shift block B6. The shift levers are driven by actuators such as motors to move the shift blocks B1, B2, B4, and B6.

In the case where the shift operation is performed with the actuators, the rotation speed of the engine and the rotation speed of the output shaft are detected by rotation sensors in the transmission TM described with reference to FIG. 8. The detection results are introduced to an engine control unit (ECU). Based on a gear shift map (speed change map) stored in the ECU, a drive control is performed on the actuator associated with the appropriate (desired) gear position to achieve the desired gear shifting.

LISTING OF REFERENCES

PATENT LITERATURE 1: Japanese Patent Application Laid-Open Publication (Kokai) No. 2003-240115

PATENT LITERATURE 2: Japanese Patent Application Laid-Open Publication No. 2010-159823

A general automatic shifting device, which has one actuator for the shift operation and one actuator for the select operation, requires the following operations for the elbow plus elbow shifting. Specifically, disengagement of the gear, a select operation, and a shift operation for engaging the gear are sequentially performed. Additionally, the ECU needs time to determine, by means of its hardware and software, that the respective operations are completed. Accordingly, there is a problem that the elbow plus elbow shifting requires more time for speed change (gear shifting) as compared with the straight shifting.

To cope with this problem, as illustrated in FIG. 12, actuators A1, A2, A4, and A6 are disposed. The actuators A1, A2, A4, and A6 independently operate the shift blocks B1, B2, B4, and B6. These actuators A1, A2, A4, and A6 are sequentially driven so as to eliminate the shift operation. The straight shifting is defined as an ordinary shift operation (the shift operation from the 2nd speed to the 3rd speed in the drawing). The elbow plus elbow shifting only needs to disengage the gear from the current gear position (the shift operation from the 3rd speed to the neutral position in the drawing), make a determination of the gear disengagement in the position enclosed by a circle illustrated in the drawing, and then perform the shift operation to the desired gear position (the shift operation in the shift block B4 from the neutral position to the 4th speed in the drawing) for gear engagement.

While this automatic shifting device of FIG. 12 can be fabricated based on the transmission illustrated in FIG. 8 to FIG. 10, the actuators A1, A2, A4, and A6 are required corresponding to the number of the shift blocks B1, B2, B4, and B6. When these actuators A1, A2, A4, and A6 should be mounted, it is not easy to find good locations for the mounting, and the driving circuit (mechanism) of these actuators is also required. For hydraulic or pneumatic actuators, the actuators can be made from cylinders and pistons, but there is a problem that hydraulic piping or pneumatic piping and a hydraulic source or a pneumatic source are required.

Alternatively, as illustrated in FIG. 13, odd speed gear positions are paired, and even gear positions are paired so as to enable straight shifting. Specifically, the straight shifting is enabled between the 1st speed and the 3rd speed, the straight shifting is enabled between the 5th speed and the reverse, the straight shifting is enabled between the 2nd speed and the 4th speed, and the straight shifting is enabled to the 6th speed. For the 1st speed-3rd speed and the 5th speed-reverse, the shift operation is performed with an odd-number-pair actuator Ao. For the 2nd speed-4th speed and the 6th speed, the shift operation is performed with an even-number-pair actuator Ae. Accordingly, in the shift operation from the 2nd speed to the 3rd speed, the gear position is shifted from 2nd speed to the neutral position by the even-number-pair actuator Ae, and the gear is disengaged. Subsequently, a determination on the gear disengagement is made. Then, the shift operation can be performed from the neutral position to the 3rd speed by the odd-number-pair actuator Ao, and the gear is engaged. From the 3rd speed to the 4th speed, the gear position is shifted from the 3rd speed to the neutral position by the odd-number-pair actuator Ao and the gear is disengaged. Subsequently, a determination on the gear disengagement is made. Then, the shift operation can be performed from the neutral position to 4th speed by the even-number-pair actuator Ae, and the gear is engaged.

The automatic shifting device of FIG. 13 can operate with the odd-number-pair actuator Ao, the even-number-pair actuator Ae, and the actuator for select operation. This allows reducing the number of actuators. Also, because this allows performing the select operation prior to shifting the gear position, the time for the gear shifting is not adversely influenced.

However, the arrangement of the shift forks in the shift control system of the transmission described with reference to FIG. 9 and FIG. 10 corresponds to the respective gear positions of the transmission described with reference to FIG. 8. Therefore, the shift pattern of FIG. 13 cannot be applied to an existing manual transmission, and requires a dedicated transmission. This becomes a factor that significantly worsens the cost.

Therefore, as illustrated in FIG. 14, the arrangement of the shift blocks B1, B2, B4, and B6 is unchanged, and the shift operations of the shift block B1 in the first row and the shift block B4 in the third row are performed by an actuator Aa whereas the shift operations of the shift block B2 in the second row and the shift block B6 in the fourth row are performed by an actuator Ab. This shift pattern can be applied to the existing manual transmission.

However, when the shift operations of the shift block B1 in the first row and the shift block B4 in the third row are performed by the actuator Aa and the shift operations of the shift block B2 in the second row and the shift block B6 in the fourth row are performed by the actuator Ab, it is necessary to arrange the actuators Aa and Ab opposed to each other across the shift blocks B1, B2, B4, and B6. Additionally, there is a problem that the mechanism for the select operation becomes complicated. This causes an increase in size, complication, and deterioration in cost of the automatic shifting device.

SUMMARY OF THE INVENTION

Therefore, an object of the present invention is to provide a transmission device (speed change apparatus) of a vehicle that can solve the above-described problems and perform an automatic gear shift using a manual transmission without modifications.

To achieve the above-described object, the present invention of claim 1 provides a transmission device of a vehicle (vehicular transmission device) using a transmission. In the transmission, gear positions of a reverse and a 1st speed can be arranged opposite to one another, gear positions of a 2nd speed and a 3rd speed can be arranged opposite to one another, gear positions of a 4th speed and a 5th speed can be arranged opposite to one another, and a gear position of a 6th speed can be disposed. The transmission device includes shift blocks used for shift operations to the gear positions. The transmission is configured to perform select operations and then perform shift operations of the shift blocks for automatic gear shifting. The transmission device of the vehicle includes first to fourth shift levers, a select actuator, a first shift actuator, a second shift actuator, a gear disengagement determination unit, and a drive unit. The shift blocks are arranged in the order from the shift block of the reverse-1st speed, the shift block of the 4th speed-5th speed, the shift block of the 2nd speed-3rd speed, and the shift block of the 6th speed in a direction of the select operation. The first to fourth shift levers engage with the shift blocks. The select actuator is configured to move, by the select operation, the first to fourth shift levers. The first shift actuator is configured to move the first or second shift lever by the shift operation. The second shift actuator is configured to move the third or fourth shift lever by the shift operation. The gear disengagement determination unit is configured to determine whether a gear disengagement is made at a desired gear position when the gear disengagement and/or gear engagement is performed by the first and second shift actuators. The drive unit is configured to drive one of the first and second shift actuators which is used for the gear disengagement. The drive unit is configured to drive the other of the first and second shift actuators which is used for the gear engagement when the gear disengagement determination unit determines that the gear disengagement is made.

In this transmission device, the gear positions of the reverse and the 1st speed can be arranged opposite to one another, the gear positions of the 2nd speed and the 3rd speed can be arranged opposite to one another, the gear positions of the 4th speed and the 5th speed can be arranged opposite to one another, and shift shafts parallel to one another can be disposed at the gear position of the 6th speed. A first shift fork is fixedly secured on one of the shift shafts (first shift shaft), and the shift block of the reverse-1st speed is also fixedly secured to the same shift shaft (first shift shaft). The first shift fork is configured to move a first sleeve that shifts the gear positions of the reverse and the 1st speed. A second shift fork is disposed on the same shift shaft (first shift shaft) such that the second shift fork is movable in an axial direction. The second shift fork is configured to move a second sleeve that shifts the gear positions of the 2nd speed and the 3rd speed. The shift block of the 2nd speed-3rd speed is coupled to the second shift fork. A fourth shift fork is coupled to the other shift shaft (second shift shaft) via a link lever, and the shift block of the 6th speed is fixedly secured to the second shift shaft. The fourth shift fork is configured to moves a fourth sleeve that shifts to the gear position of the 6th speed. A third shift fork is disposed on the second shift shaft such that the third shift fork is movable in an axial direction. The third shift fork is configured to move a third sleeve that shifts the gear positions of the 4th speed and the 5th speed. The shift block of the 4th speed-5th speed is coupled to the third shift fork.

In this transmission device, each of the first shift lever and the second shift lever can be formed in an L shape. The first shift lever is spaced from the second shift lever in an up-down direction, and the first and second shift levers are disposed to be turnable horizontally. Each of the first shift lever and the second shift lever has a lever portion in the L-folded part. The lever portion of the first shift lever engages with the shift block of the reverse-1st speed, and the lever portion of the second shift lever engages with the shift block of the 4th speed-5th speed. Turning of the first shift lever and the second shift lever causes moving, by the shift operation, of the shift block of the reverse-1st speed and the shift block of the 4th speed-5th speed via the lever portions.

In this transmission device, each of the third shift lever and the fourth shift lever can be formed in an L shape. The third shift lever is spaced from the fourth shift lever in the up-down direction, and the third and fourth shift levers are disposed to be turnable horizontally. The third shift lever and the fourth shift lever are disposed opposite the first shift lever and the second shift lever. Each of the third shift lever and the fourth shift lever has a lever portion in the L-folded part. The lever portion of the third shift lever engages with the shift block of the 2nd speed-3rd speed, and the lever portion of the fourth shift lever engages with the shift block of the 6th speed-5th speed. Turning of the third shift lever and the fourth shift lever causes moving, by the shift operation, of the shift block of the 2nd speed-3rd speed and the shift block of the 6th speed via the lever portions.

In this transmission device, the gear disengagement determination unit can have sensors for detecting amounts of shift (movements) of the respective shift blocks or the first and second shift actuators. The gear disengagement determination unit determines, based on the amounts of shift detected by the sensors, whether the gear disengagement is made. The drive unit receives a determination result of "gear disengaged" or "gear disengagement made" from the gear disengagement determination unit. When the gear shifting should be performed between the 2nd speed and the 3rd speed or between the 4th speed and the 5th speed, the drive unit drives the first or second shift actuator, without additional operation, to perform the gear disengagement or engagement. When the gear shifting should be made between the 1st speed and the 2nd speed, between the 3rd speed and the 4th speed, or between the 5th speed and the 6×th speed, the drive unit drives (moves) the shift actuator which is used for the gear disengagement to a neutral position upon determination of the gear disengagement, and also drives the other shift actuator, which is used for the gear engagement, to perform the gear engagement.

With the present invention, simply changing the arrangement order of the shift blocks provides an excellent effect that allows automatic gear shifting with a simple structure using the existing manual transmission. The present invention also has an excellent effect that allows parallel activation of the shift actuators for the gear disengagement and gear engagement during the elbow plus elbow shifting because the gear disengagement is detected prior to moving the gear position to the neutral position, when the gear engagement and disengagement are performed by the shift actuators. This significantly reduces time for gear shifting.

DETAILED DESCRIPTION

The following describes embodiments of the present invention in detail with reference to the accompanying drawings.

Figure 8:
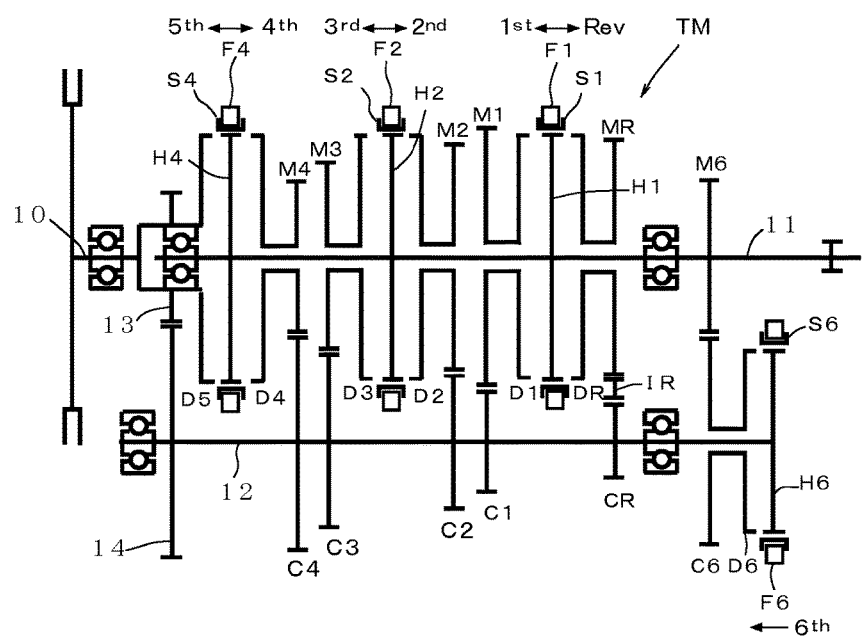
FIG. 8 is a skeleton diagram of an existing transmission to be used in the embodiment of the present invention.

The transmission TM to be used in the embodiment of the present invention is as described in relation to FIG. 8. Thus, the description of the transmission TM is omitted.

Next, a description will be given of a shift control system of the transmission TM of FIG. 8 with reference to FIG. 1 to FIG. 3.

Figure 1:
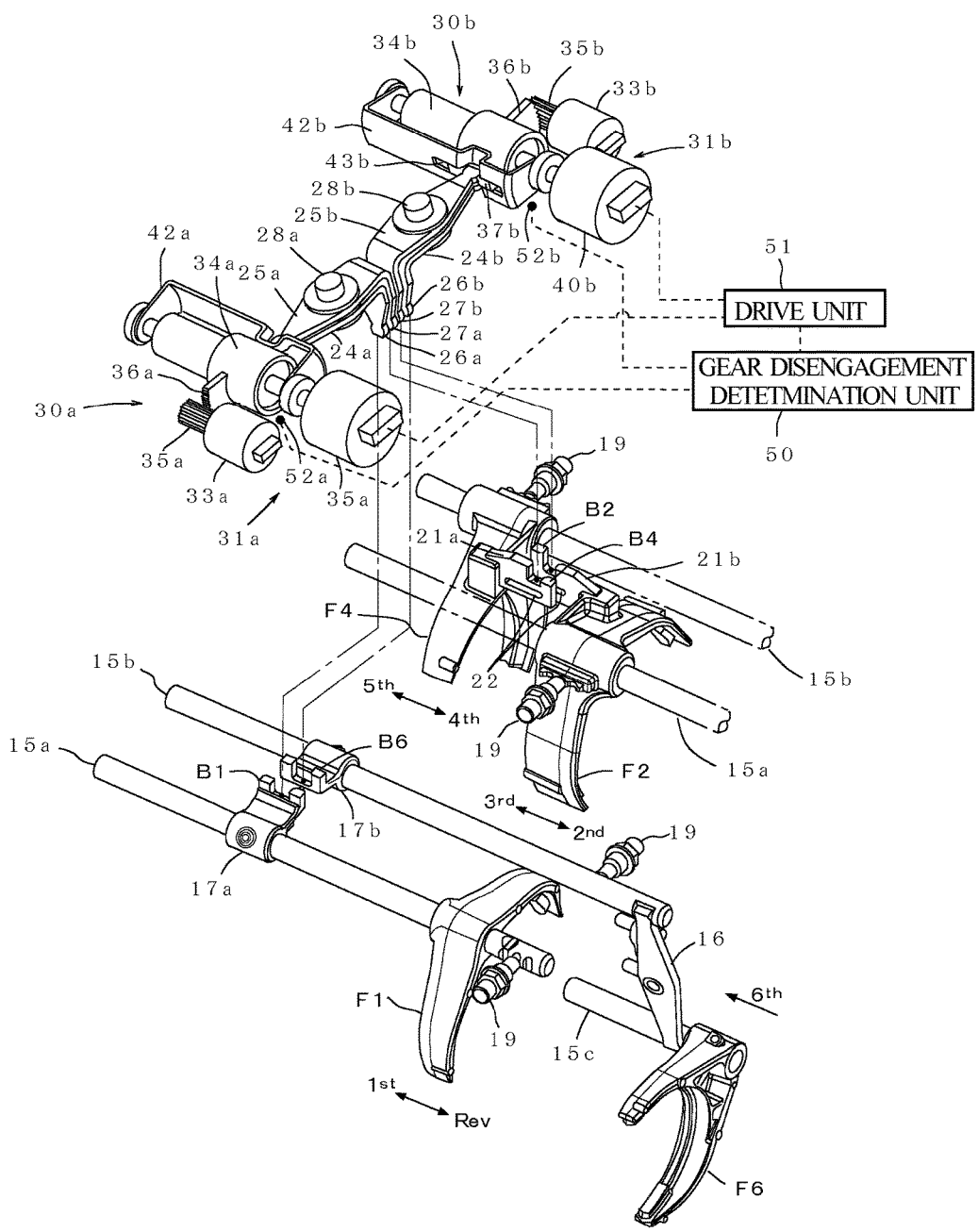
FIG. 1 is an exploded perspective view illustrating a shift control system and an automatic shifting device of a transmission device of a vehicle according to one embodiment of the present invention.
Figure 2:
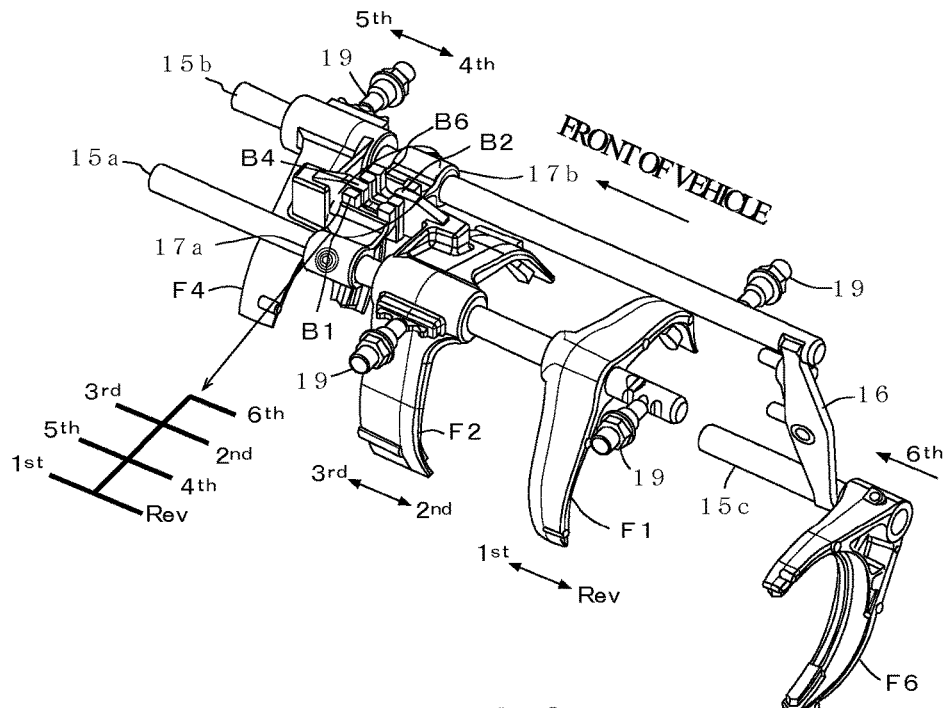
FIG. 2 is a perspective view illustrating the shift control system of the transmission device of the vehicle according to the embodiment of the present invention.
Figure 3:
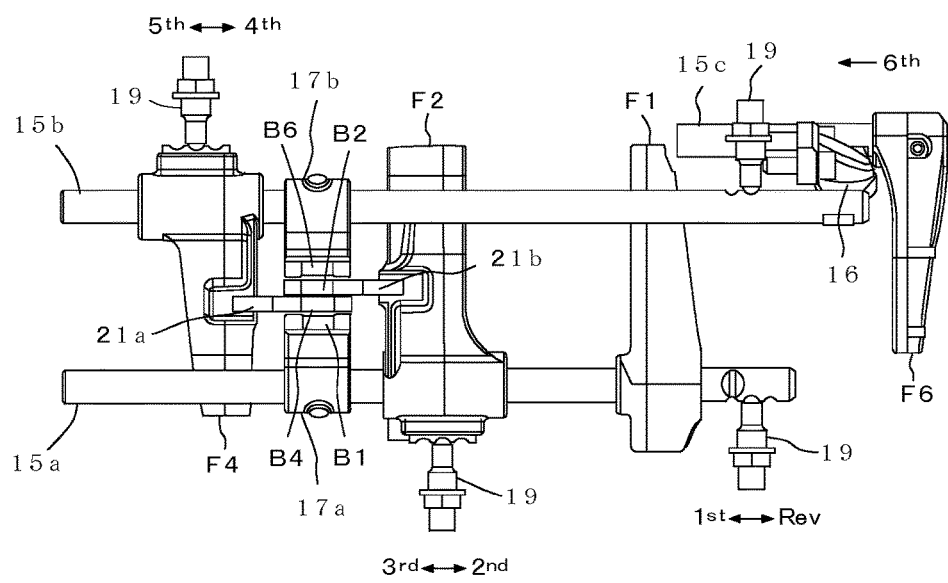
FIG. 3 is a plan view of FIG. 2.

This shift control system of the transmission TM in FIG. 1 to FIG. 3 is basically the same as the conventional shift control system described with reference to FIG. 9 and FIG. 10. Same or like reference numerals designate identical or corresponding elements in the following description.

In the shift control system of FIG. 1 to FIG. 3, the arrangement configuration of the shift shafts 15a and 15b and the first to fourth shift forks F1, F2, F4, and F6 are the same. This configuration will be described below. The low speed and high speed shift shafts 15a and 15b are disposed parallel to the vehicle width direction and along the longitudinal direction of the vehicle direction. At the rear portion of the low speed shift shaft 15a, the first shift fork F1 is fixedly secured. The first shift fork F1 shifts between the 1st speed and the reverse (Rev). In front of the first shift fork F1, the second shift fork F2 is disposed to be movable in the axial direction with respect to the shift shaft 15a. The second shift fork F2 shifts between the 2nd speed and the 3rd speed.

On the other hand, the third shift fork F4 is disposed at the front portion of the high speed shift shaft 15b such that the third shift fork F4 is movable in the axial direction with respect to the shift shaft 15b. The third shift fork F4 shifts between the 4th speed and the 5th speed. At (near) the rear portion of the shift shaft 15b, the counter shaft shift 15c is disposed parallel to the shift shaft 15b. The shift shaft 15b and the counter shaft shift 15c are coupled together by the link lever 16. The fourth shift fork F6 is fixedly secured on the counter shaft shift 15c. The fourth shift fork F6 shifts to the 6th speed.

For the shift shafts 15a and 15b, the second shift fork F2, and the third shift fork F4, the respective gear positions and neutral positions are held by the ball clicks 19.

Figure 9:
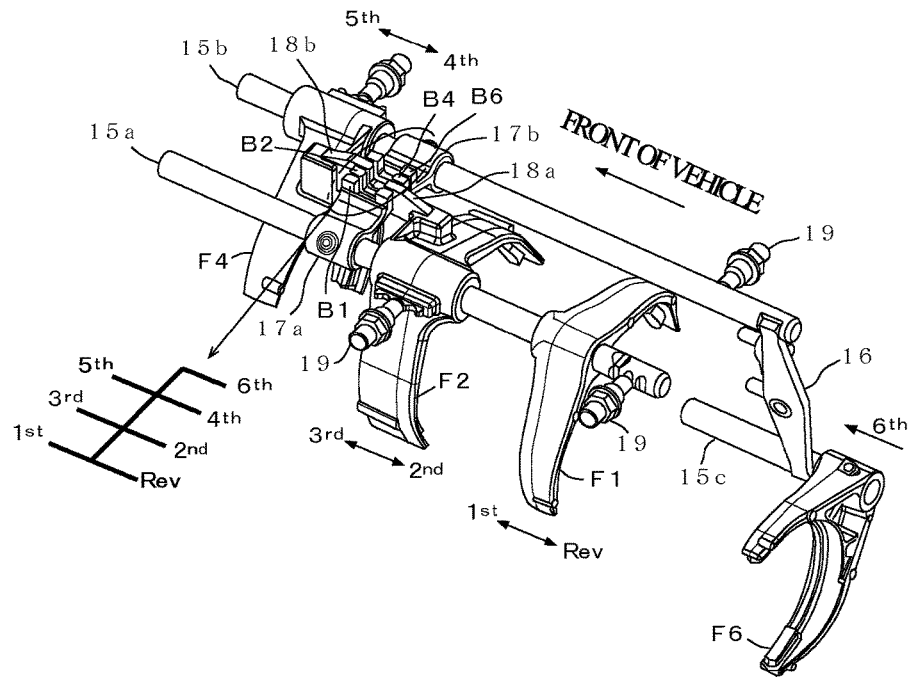
FIG. 9 is a perspective view illustrating a shift control system of a conventional transmission device of a vehicle.
Figure 10:
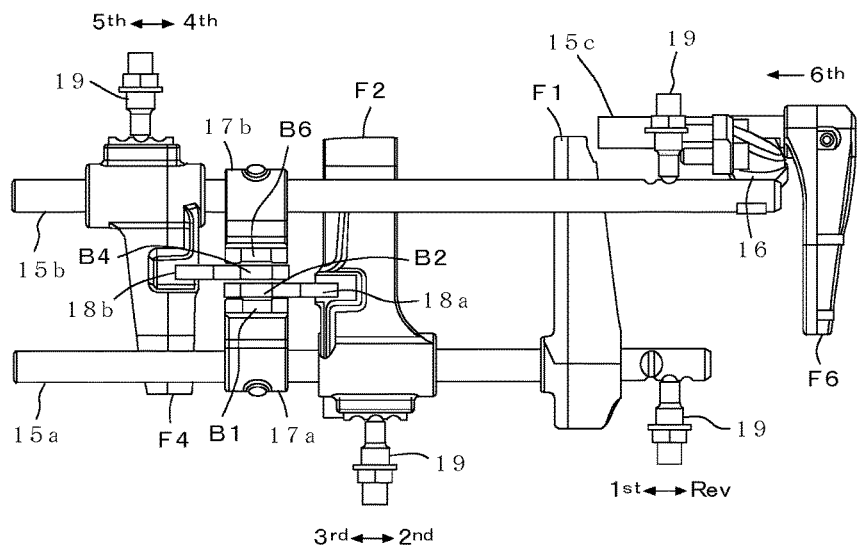
FIG. 10 is a plan view of FIG. 9.
Figure 11:
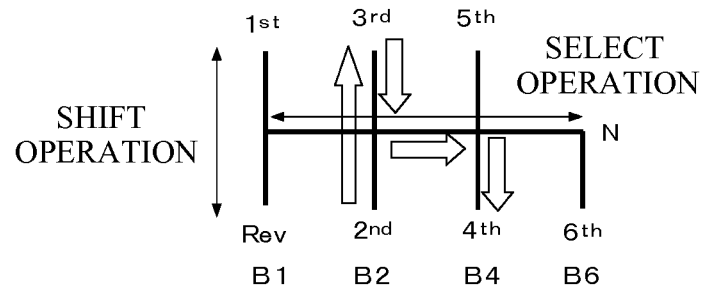
FIGS. 11(a)-11(c) are diagrams illustrating shift patterns and gear shifting operations in the conventional transmission device of the vehicle.
Figure 11:
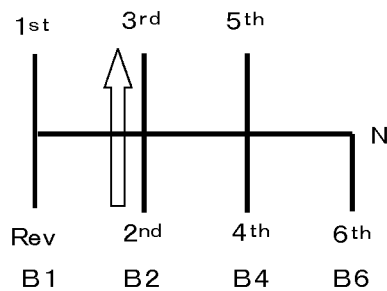
Figure 11:
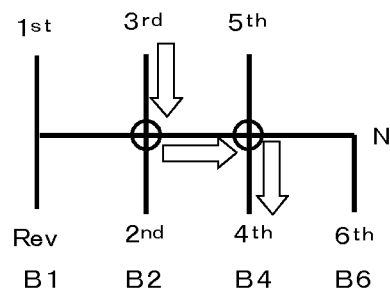
Figure 12:
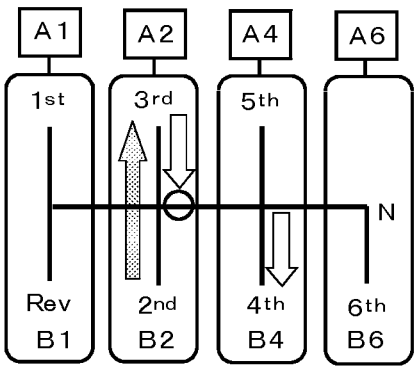
FIG. 12 is a diagram illustrating shift patterns and gear shifting operations when the automatic shifting device is applied to the conventional transmission device of the vehicle.
Figure 13:
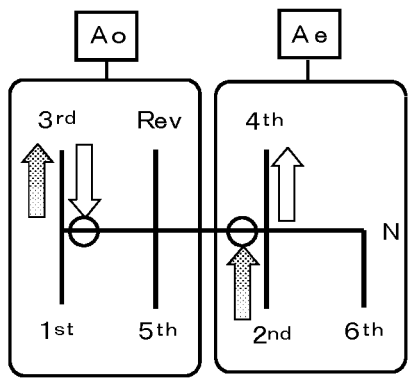
FIG. 13 is a diagram illustrating other shift patterns and gear shifting operations of the automatic shifting device.
Figure 14:
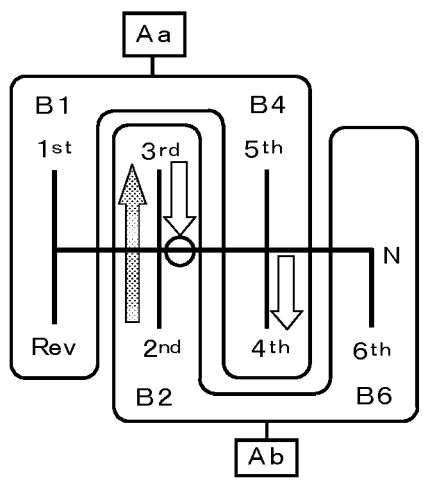
FIG. 14 is a diagram illustrating other shift patterns and gear shifting operations when the automatic shifting device is applied to the conventional transmission.

The difference between the shift control system in FIG. 1 to FIG. 3 and the shift control system in FIG. 9 and FIG. 10 lies in that the arrangement order of the shift blocks B1, B2, B4, and B6 is changed.

Specifically, the shift block B1 of the reverse-1st speed, the shift block B4 of the 4th speed-5th speed, the shift block B2 of the 2nd speed-3rd speed, and the shift block B6 of the 6th speed are arranged in the select operation direction from the low speed shift shaft 15a to the high speed shift shaft 15b in FIGS. 9 and 10. When this arrangement is compared with the arrangement illustrated in FIGS. 9 and 10, the shift block B2 of the 2nd speed-3rd speed and the shift block B4 of the 4th speed-5th speed are reversed in position.

The shift block B1 of the reverse-1st speed is fixedly secured on the shift shaft 15a via the boss 17a. The shift block B6 of the 6th speed is fixedly secured on the other shift shaft 15b via the boss 17b. The shift block B4 of the 4th speed-5th speed is coupled to the third shift fork F4 by a coupling member 21a. The shift block B2 of the 2nd speed-3rd speed is coupled to the second shift fork F2 by a coupling member 21b.

Figure 5:
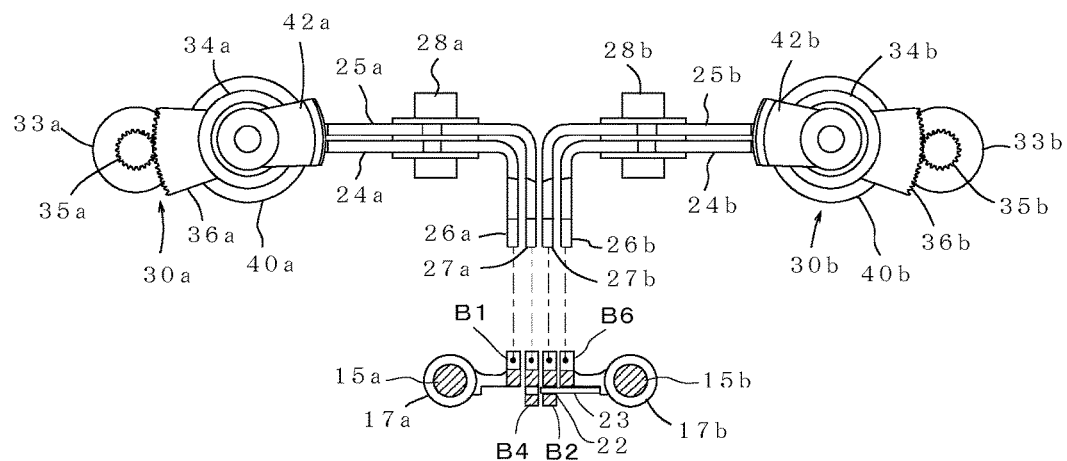
FIG. 5 is a front view of FIG. 4.

In the shift block B2 of the 2nd speed-3rd speed, an elongated hole 22 is formed. As illustrated in FIG. 5, a guide shaft 23 is fitted in the elongated hole 22. The guide shaft 23 is disposed at the boss 17b of the shift block B6 of the 6th speed. The elongated hole 22 of the shift block B6 of the 6th speed and the guide shaft 23 guide the movement of the shift block B6 of the 6th speed in the shift operation direction. It should be noted that an elongated hole 22 is also formed in the shift block B4 of the 4th speed-5th speed because the shift block B4 having the elongated hole 22 can be fabricated as a common component with the shift block B6 of the 6th speed.

With the shift blocks B1, B4, B2, and B6 arranged in this manner, first to fourth shift levers 24a, 25a, 25b, 24b are respectively engaged in the arrangement order. The shift operations are performed with the first to fourth shift levers 24a, 25a, 25b, and 24b.

Figure 4:
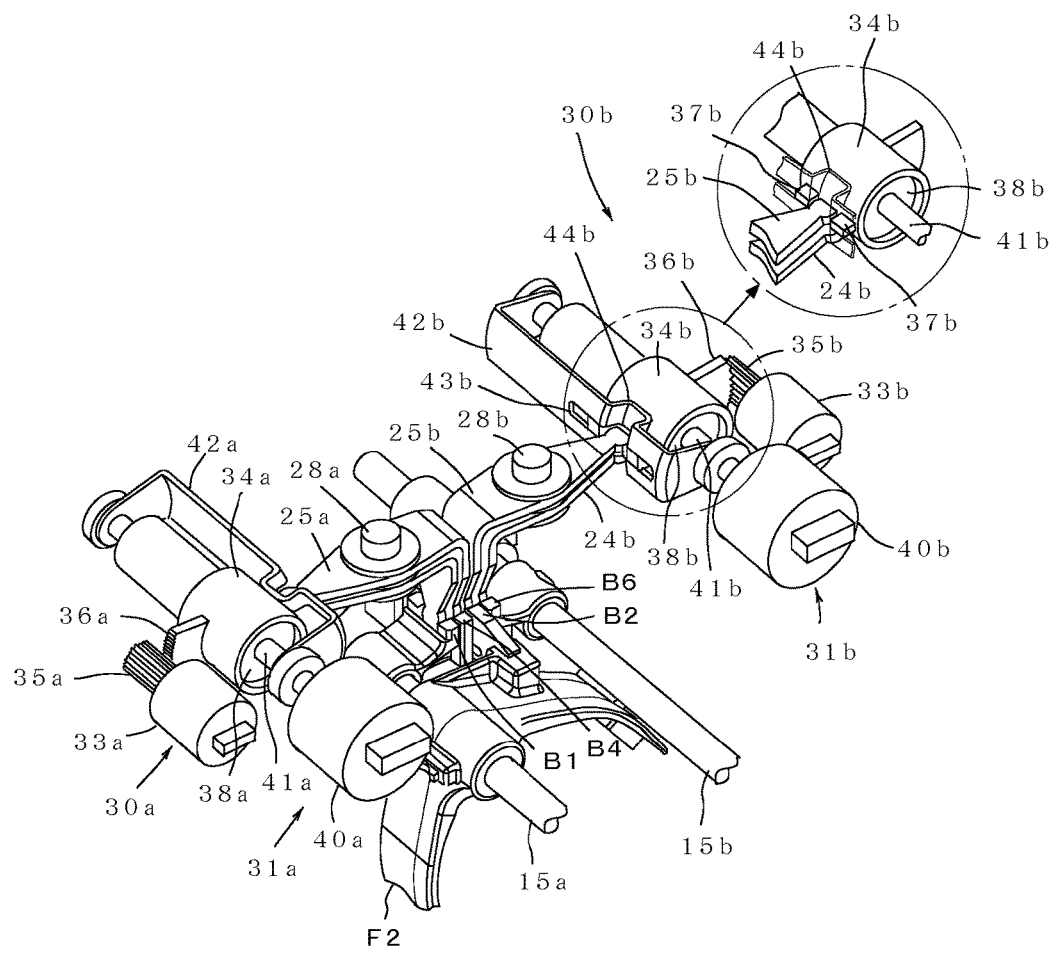
FIG. 4 is a perspective view illustrating the automatic shifting device of the transmission device of the vehicle according to the embodiment of the present invention.

As illustrated in FIG. 1, FIG. 4, and FIG. 5, the first shift lever 24a and the second shift lever 25a are disposed opposite to the third shift lever 25b and the fourth shift lever 24b, and are formed in an L shape.

As illustrated in FIG. 5, the second shift lever 25a and the first shift lever 24a are disposed to be distant from each other in the up-down direction (height direction) and to be turnable horizontally (in a horizontal plane) about a shaft 28a. In the first shift lever 24a, a lever portion 26a in the L folded part engages with the shift block B1 of the reverse-1st speed. In the second shift lever 25a, a lever portion 27a in the L folded part engages with the shift block B4 of the 4th speed-5th speed.

The third shift lever 25b and the fourth shift lever 24b are disposed to be distant from each other in the up-down direction and to be turnable in the horizontal plane about a shaft 28b. In the third shift lever 25b, a lever portion 27b in the L folded part engages with the shift block B2 of the 2nd speed-3rd speed. In the fourth shift lever 24b, a lever portion 26b in the L folded part engages with the shift block B6 of the 6th speed.

The first to fourth shift levers 24a, 25a, 25b, and 24b are turned around the shafts 28a and 28b so as to move, by the shift operation, the respective shift blocks B1, B4, B2, and B6 via the associated lever portions 26a, 27a, 27b, and 26b.

The first shift lever 24a, which shifts the shift block B1 of the reverse-1st speed, or the second shift lever 25a, which shifts the shift block B4 of the 4th speed-5th speed, is moved by a first select actuator 30a for the select operation. After the select operation, the first shift lever 24a or the second shift lever 25a is moved by a first shift actuator 31a for the shift operation.

The third shift lever 25b, which shifts the shift block B2 of the 2nd speed-3rd speed, or the fourth shift lever 24b, which shifts the shift block B6 of the 6th speed, is moved by a second select actuator 30b for the select operation. After the select operation, the third shift lever 25b or the fourth shift lever 24b is moved by a second shift actuator 31b for the shift operation.

The first and second select actuators 30a and 30b include select motors 33a and 33b and rotatable shift cylindrical bodies 34a and 34b. The shift cylindrical body 34a or 34b engages with any of the rear ends of the first and second shift levers 24a and 25a or the rear ends of the third and fourth shift levers 25b and 24b (the rear ends opposite the lever portions 26a, 27a, 27b, and 26b) upon rotation of the select motor 33a or 33b. Turning gears 35a and 35b are disposed at the select motors 33a and 33b. At the shift cylindrical bodies 34a and 34b, select gears 36a and 36b are disposed. The select gears 36a and 36b engage with the turning gears 35a and 35b. On the opposite sides of the select gears 36a and 36b at the shift cylindrical bodies 34a and 34b, a pair of engagement protrusions 37a and 37b are disposed. The engagement protrusion 37a or 37b engages with any of the rear ends of the first and second shift levers 24a and 25a or the rear ends of the third and fourth shift levers 25b and 24b (the rear ends opposite the lever portions 26a, 27a, 27b, and 26b).

Figure 6:
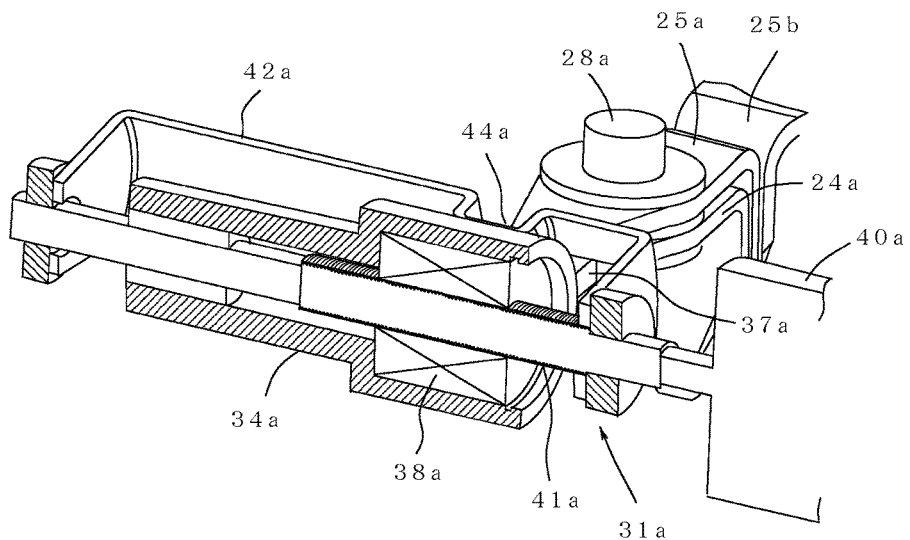
FIG. 6 illustrates the detail of a shifting unit and an actuator in FIG. 4.

The first and second shift actuators 31a and 31b include shift motors 40a and 40b and ball screws 41a and 41b (FIG. 6). The ball screws 41a and 41b are coupled to the shift motors 40a and 40b, and are threadably mounted on nut portions 38a and 38b of the shift cylindrical bodies 34a and 34b so as to reciprocate the shift cylindrical bodies 34a and 34b in the shift operation direction.

U-shaped interlock plates 42a and 42b are disposed on the shafts of the ball screws 41a and 41b. The interlock plates 42a and 42b house (receive) the distal end portions of the engagement protrusions 37a and 37b of the shift cylindrical bodies 34a and 34b, and the rotations of the interlock plates 42a and 42b are restricted (regulated) by the shift cylindrical bodies 34a and 34b. The interlock plates 42a and 42b have interlock grooves 43a and 43b and depression grooves (recesses) 44a and 44b. The interlock grooves 43a and 43b guide the shift cylindrical bodies 34a and 34b in the shift operation direction. The grooves 44a and 44b receive the rear ends (ends opposite the lever portions 26a, 27a, 27b, 26b) of the first to fourth shift levers 24a, 25a, 25b, and 24b between the engagement protrusions 37a and 37b. Movements of the shift levers 24a, 25a, 25b, and 24b that are not selected by the engagement protrusions 37a and 37b are restricted (regulated) by the grooves 44a and 44b.

The first and second select actuators 30a and 30b control the rotation positions of the shift cylindrical bodies 34a and 34b via the turning gears 35a and 35b and the select gears 36a and 36b with the forward direction rotation or the reverse direction rotation of the select motors 33a and 33b. The first and second select actuators 30a and 30b select one of the two positions of the engagement protrusions 37a and 37b. At one of the two positions (higher position), the engagement protrusions 37a and 37b are engaged with the rear ends of the second shift lever 25a and the third shift lever 25b (the rear ends opposite the lever portions 27a and 27b). At the other position (lower position), the engagement protrusions 37a and 37b are engaged with the rear ends of the first and fourth shift levers 24*a* and 24*b* (the rear ends opposite the lever portions 26*a* and 26*b*).

In the state where the second shift lever 25*a* and the third shift lever 25*b* in the upper position are selected or the first shift lever 24*a* and the fourth shift levers 24*b* in the lower position are selected, the shift motors 40*a* and 40*b* of the first and second shift actuators 31*a* and 31*b* are rotated in the forward rotation direction or the reverse rotation direction. Upon the rotations of the shift motors, the shift cylindrical bodies 34*a* and 34*b* are moved from the neutral position in the shift operation direction by the ball screws 41*a* and 41*b*. Accordingly, the first to fourth shift levers 24*a*, 25*a*, 25*b*, and 24*b* are turned around the shafts 28*a* and 28*b* so as to move the shift blocks B1, B4, B2, and B6 in the shift operation direction via the lever portions 26*a*, 27*a*, 27*b*, and 26*b*. Thus, the gear is engaged at a desired gear position or the gear is disengaged from a desired gear position to the neutral position.

With the above-described configuration, when the gear shifting should be performed between the 2nd speed and the 3rd speed, the second shift actuator 31*b* is moved by the straight shifting, without additional operation (movement). When the gear shifting should be performed between the 4th speed and the 5th speed, the first shift actuator 31*a* is moved by the straight shifting, without additional operation. However, when the gear shifting should be performed between the 1st speed and the 2nd speed, between the 3rd speed and the 4th speed, or between the 5th speed and the 6th speed, the elbow plus elbow shifting is needed. Although the select operation can be done beforehand in the elbow plus elbow shifting, the first and second shift actuators 31*a* and 31*b* are driven sequentially. The first shift actuator 31*a* or the second shift actuator 31*b* which is used for the gear disengagement moves the shift block B1, B4, B2, B6 to the neutral position, and then the second shift actuator 31*b* or the first shift actuator 31*a* which is used for the gear engagement moves the shift block B1, B4, B2, B6 toward the gear engagement position. Therefore, when the elbow plus elbow shifting is compared with the straight shifting that only drives one of the first shift and second shift actuators 31*a* and 31*b* alone, the elbow plus elbow shifting requires more time than the straight shifting. To cope with this, the embodiment of the present invention employs the gear disengagement determination unit 50 to determine whether the gear disengagement is made by the first or second shift actuator 31*a*, 31*b*. Immediately after the gear disengagement determination unit 50 determines that the gear disengagement is made, the drive unit 51 drives the first or second shift actuator 31*a*, 31*b* for the gear disengagement and simultaneously drives the second or first shift actuator 31*b*, 31*a* for the gear engagement.

The gear disengagement determination unit 50 has sensors 52*a* and 52*b* for detecting an amount of shift (movement) caused by the first or second shift actuator 31*a*, 31*b*, or an amount of shift (movement) of each of the shift blocks B1, B4, B2 and B6. The gear disengagement determination unit 50 determines whether the gear disengagement is made or not, based on the amount(s) of shift detected by the sensors 52*a* and/or 52*b*. As described with reference to FIG. 8, the sleeve S1, S2, S4 or S6 meshes (spline-engages) with the dog DR or D1, the dog D2 or D3, the dog D4 or D5, or the dog D6 when the gear engagement is made. When the sleeve S1, S2, S4 or S6 meshes with the dog DR, D1, D2, D3, D4, D5 or D6 and the gear disengagement is intended, the gear disengagement is in effect made (substantive gear disengagement is made) prior to reaching the neutral position. Because the range for this meshing (spline engagement) is decided by the design specifications of the transmission TM to be used, it is possible for the sensors 52*a* and 52*b* to detect an amount of shift (movement) to exit the meshing range (gear disengagement determination position). It should be noted that the ECU may determine the meshing ranges of the respective gears (dogs) by means of initial learning, and store the position data (gear disengagement determination position) at which the respective shift blocks exit the meshing ranges (spline engagement ranges).

In the embodiment of the present invention, an amount of shift to exit the respective meshing range is stored in the gear disengagement determination unit 50. After the gear disengagement determination unit 50 determines the substantive gear disengagement, the drive unit 51 drives the second or first shift actuator 31*b*, 31*a* for the gear engagement while driving the first or second shift actuator 31*a*, 31*b* for the gear disengagement.

The automatic shift operation with the gear disengagement determination unit 50 and the drive unit 51 will be described with reference to FIG. 7.

Firstly, as described above, when selecting (deciding) a particular gear position, the ECU selects the gear position using the engine rotation speed, the engine load, the output shaft rotation speed (vehicle speed), and other parameters based on a speed change map that is stored in the ECU beforehand.

Figure 7:
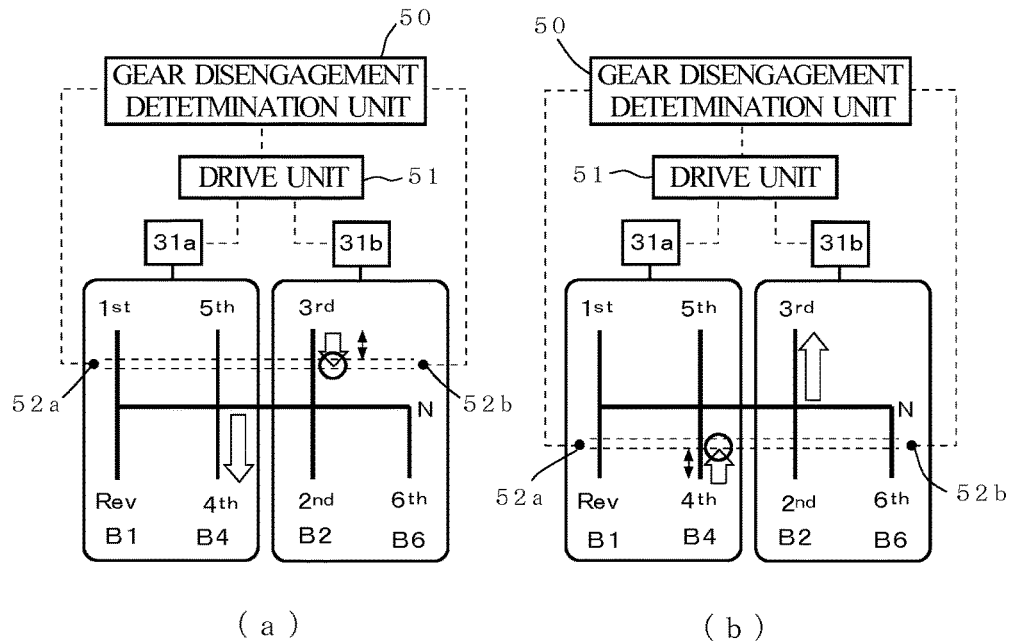
FIGS. 7(a) and 7(b) are diagrams illustrating shift patterns and gear shifting operations in the transmission device of the vehicle according to the embodiment of the present invention.

In FIGS. 7(*a*) and 7(*b*), the shift block B1, B2, B4 or B6 is already moved by the select operation, and the first or second shift actuator 31*a*, 31*b* now moves the shift block B1, B2, B4 or B6 by the shift operation. The sensor 52*a*, 52*b* detects a gear disengagement determination position of each gear position from the shift amount of each shift actuator 31*a*, 31*b*, the moved position of each shift block B1, B4, B2, B6 and other information. The sensors 52*a* and 52*b* send the detected positions to the gear disengagement determination unit 50. The gear disengagement determination unit 50 determines whether the gear disengagement is made, based on the detection value of the sensor 52*a*, 52*b* when the shift block B1, B4, B2, B6 is moved from the gear engagement state to the neutral position N by the shift operation.

When the straight shifting is performed between the 2nd speed and the 3rd speed, the drive unit 51 drives the second shift actuator 31*b* by the straight shifting without additional operation. When the straight shifting is performed between the 4th speed and the 5th speed, the drive unit 51 drives the first shift actuator 31*a* by the straight shifting without additional operation.

As illustrated in FIG. 7(*a*), when the elbow plus elbow shifting is performed from the 3rd speed to the 4th speed, the select actuators 30*a* and 30*b* already moved, by the select operation, the shift block B2 of the 2nd speed-3rd speed and the shift block B4 of the 4th speed-5th speed in advance. Thus, the drive unit 51 drives the second shift actuator 31*b* to move the shift block B2 of the 2nd speed-3rd speed to the neutral position N from the 3rd speed gear-engaged state for the gear disengagement. The drive unit 51 also chives the first shift actuator 31*a* to perform the gear engagement to the 4th speed from the neutral position. The sensor 52*b* detects the gear disengagement while the shift block B2 is being moved to the neutral position N from the 3rd speed gear-engaged state. The sensor 52*b* sends a signal representing the gear disengagement to the drive unit 51 via the gear disengagement determination unit 50. Accordingly, the drive unit 51 simultaneously drives the first shift actuator 31*a*, in parallel to the second shift actuator 31*b*, to move the shift block B4 to the 4th speed gear position from the neutral position N by the shift operation.

As shown in FIG. 7(b), on the other hand, when the elbow plus elbow shifting is performed from the 4th speed to the 3rd speed, the drive unit 51 drives the first shift actuator 31a to move the shift block B4 of the 4th speed-5th speed to the neutral position N from the 4th speed gear-engaged state for the gear disengagement. When the sensor 52a detects the gear disengagement, the drive unit 51 simultaneously drives the second shift actuator 31b, in parallel to the first shift actuator 31a, to move the shift block B2 to the third gear position from the neutral position N by the shift operation.

Although not described in detail, when the elbow plus elbow shifting is performed between the 1st speed and the 2nd speed, and between the 5th speed and the 6th speed, the drive unit 51 simultaneously drives the first and second shift actuators 31a and 31b when the gear disengagement determination unit 50 determines the gear disengagement. This is similar to the elbow plus elbow shifting between the 3rd speed and the 4th speed.

As described above, when the elbow plus elbow shifting is performed, the first shift actuator 31a and the second shift actuator 31b are driven in parallel from a position of when the gear disengagement is detected by the sensor 52a, 52b to the neutral position N. Therefore, the gear shift for the elbow plus elbow shifting can be performed in substantially the same time as the straight shift between the 2nd speed and the 3rd speed or between the 4th speed and the 5th speed. Consequently, it is possible to significantly reduce the time spent for the gear shifting.

As described above, the embodiment of the present invention uses the conventional transmission. The shift block B2 of the 2nd speed-3rd speed and the shift block B4 of the 4th speed-5th speed are reversed in position, as compared with the conventional shift block arrangement. In the conventional shift block arrangement, the shift blocks are arranged in the order from the low speed gear to the high speed gear. In the embodiment of the present invention, the shift blocks B2 and B4 are coupled to the shift forks F2 and F4 via the coupling members 21a and 21b. This simple configuration allows an automatic shift with a simple structure using the existing manual transmission. When the gear engagement and gear disengagement are performed by the shift actuators 31a and 31b, the gear disengagement is detected before the gear position returns to the neutral position N. Thus, when the elbow and elbow shifting is performed, it is possible to drive the gear-engaging and gear-disengaging shift actuators 31a and 31b in parallel. This results in significant reduction in the gear shifting time.

What is claimed is:

1. A transmission device of a vehicle using a transmission, the transmission having a reverse gear position and a 1st speed gear position arranged opposite to one another, a 2nd speed gear position and a 3rd speed gear position arranged opposite to one another, a 4th speed gear position and a 5th speed gear position arranged opposite to one another, and a 6th speed gear position, with shift blocks configured to shift into the gear positions by a shift operation, the transmission being configured to perform a select operation and then perform the shift operation of the shift blocks for an automatic gear shifting, the transmission device comprising:

the shift blocks including a shift block of a reverse-1st speed, a shift block of a 4th speed-5th speed, a shift block of a 2nd speed-3rd speed, and a shift block of a 6th speed arranged in a direction of the select operation;

first to fourth shift levers configured to engage with the shift blocks, a first shift cylindrical body which is rotatable into a position to engage the first shift lever or the second shift lever;

a second shift cylindrical body which is rotatable into a position to engage the third shift lever or the fourth shift lever;

a first select actuator configured to control the rotation position of the first shift cylindrical body and select the position at which the first shift cylindrical body engages the first shift lever and at the position at which the first cylindrical body engages the second shift lever;

a second select actuator configured to control the rotation position of the second shift cylindrical body and select one of two positions at which the second shift cylindrical body engages the third shift lever and at the other position at which the second shift cylindrical body engages the fourth shift lever;

a first shift actuator configured to move the first or second shift lever by the shift operation;

a second shift actuator configured to move the third or fourth shift lever by the shift operation;

a gear disengagement determination unit configured to determine whether a gear disengagement is made at a desired gear position when the gear disengagement and a gear engagement are performed on the desired gear position by the first and second shift actuators; and a drive unit configured to drive one of the first and second shift actuators which is used for the gear disengagement, and drive the other of the first and second shift actuators which is used for the gear engagement when the gear disengagement determination unit determines that the gear disengagement is made.

2. The transmission device of the vehicle according to claim 1, wherein the gear positions of the reverse and the 1st speed are arranged opposite to one another, the gear positions of the 2nd speed and the 3rd speed are arranged opposite to one another, the gear positions of the 4th speed and the 5th speed are arranged opposite to one another, first and second shift shafts parallel to one another are disposed at the gear position of the 6th speed, a first shift fork is fixedly secured on the first shift shaft, the shift block of the reverse-1st speed is fixedly secured on the first shift shaft, the first shift fork is configured to actuate a first sleeve that shifts the gear positions of the reverse and the 1st speed, a second shift fork is disposed on the first shift shaft such that the second shift fork is movable in an axial direction, the second shift fork is configured to actuate a second sleeve that shifts the gear positions of the 2nd speed and the 3rd speed, the shift block of the 2nd speed-3rd speed is coupled to the second shift fork, a fourth shift fork is coupled to the second shift shaft via a link lever, the shift block of the 6th speed is fixedly secured on the second shift shaft, the fourth shift fork is configured to actuate a fourth sleeve that shifts to the gear position of the 6th speed, a third shift fork is disposed on the second shift shaft such that the third shift fork is movable in the axial direction, the third shift fork is configured to actuate a third sleeve that shifts the gear positions of the 4th speed and the 5th speed, and the shift block of the 4th speed-5th speed is coupled to the third shift fork.

3. The transmission device according to claim 1, wherein each of the first shift lever and the second shift lever is formed in an L shape, the first shift lever is spaced from the second shift lever in an up-down direction, the first and second shift levers are turnable horizontally, each of the first shift lever and the second shift lever has a lever portion in an L-folded part, the lever portion of the first shift lever engages with the shift block of the reverse-1st speed, the lever portion of the second shift lever engages with the shift block of the 4th speed-5th speed, and turning of the first shift lever and the second shift lever causes moving, by the shift operation, of the shift block of the reverse-1st speed and the shift block of the 4th speed-5th speed via the lever portions.

4. The transmission device of the vehicle according to claim 3, wherein each of the third shift lever and the fourth shift lever is formed in an L shape, the third shift lever is spaced from the fourth shift lever in an up-down direction, the third and fourth shift levers are turnable horizontally, the third shift lever and the fourth shift lever are disposed opposite the first shift lever and the second shift lever, each of the third shift lever and the fourth shift lever has a lever portion in an L-folded part, the lever portion of the third shift lever engages with the shift block of the 2nd speed-3rd speed, the lever portion of the fourth shift lever engages with the shift block of the 6th speed, and turning of the third shift lever and the fourth shift lever causes moving, by the shift operation, of the shift block of the 2nd speed-3rd speed and the shift block of the 6th speed via the lever portions.

5. The transmission device of the vehicle according to claim 1, wherein the gear disengagement determination unit has a sensor for detecting an amount of shift of each said shift block or each of the first and second shift actuators, the gear disengagement determination unit determines, based on the amount of shift detected by the sensor, whether the gear disengagement is made, and the drive unit receives a determination result of gear disengagement from the gear disengagement determination unit, when the gear shifting is performed between the 2nd speed and the 3rd speed or between the 4th speed and the 5th speed, the drive unit drives the first or second shift actuator, without additional operation, to perform the gear disengagement and/or engagement, and when the gear shifting is performed between the 1st speed and the 2nd speed, between the 3rd speed and the 4th speed, or between the 5th speed and the 6th speed, the drive unit drives the shift actuator that is used for the gear disengagement to a neutral position when the gear disengagement is determined, and also drives the other shift actuator, which is used for the gear engagement, to perform the gear engagement.

6. The transmission device of the vehicle according to claim 1, wherein the first shift lever engages with the shift block of the reverse-1st speed, the second shift lever engages with the shift block of the 4th speed-5th speed, the third shift lever engages with the shift block of the 2nd speed-3rd speed, and the fourth shift lever engages with the shift block of the 6th speed.

* * * * *